(12) United States Patent
Kim et al.

(10) Patent No.: US 12,466,290 B2
(45) Date of Patent: Nov. 11, 2025

(54) METHOD AND DEVICE FOR CONTROLLING A BATTERY USED IN ELECTRIC VEHICLE

(71) Applicant: HYUNDAI MOBIS Co., Ltd., Seoul (KR)

(72) Inventors: Young Deok Kim, Seoul (KR); Soo Kyung Jung, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 209 days.

(21) Appl. No.: 18/337,185

(22) Filed: Jun. 19, 2023

(65) Prior Publication Data

US 2023/0406154 A1 Dec. 21, 2023

(30) Foreign Application Priority Data

Jun. 20, 2022 (KR) .................. 10-2022-0074600

(51) Int. Cl.
*B60L 58/16* (2019.01)
*G01R 31/36* (2020.01)
*G01R 31/392* (2019.01)
*H01M 10/42* (2006.01)

(52) U.S. Cl.
CPC .......... *B60L 58/16* (2019.02); *G01R 31/3648* (2013.01); *G01R 31/392* (2019.01); *H01M 10/425* (2013.01); *H01M 2010/4271* (2013.01); *H01M 2220/20* (2013.01)

(58) Field of Classification Search
CPC .......... B60L 58/16; B60L 3/0046; B60L 3/12; B60L 58/10; B60L 58/12; B60L 58/18; B60L 2240/54; B60L 53/53; G01R 31/3648; G01R 31/392; H01M 10/425; H01M 2010/4271; H01M 2220/20; Y02T 10/70; G06Q 50/40; G06Q 10/30; G06Q 30/0613; G06Q 50/26; B60Y 2200/91
See application file for complete search history.

(56) References Cited

U.S. PATENT DOCUMENTS

| 9,172,118 | B2 | 10/2015 | Marsh et al. |
| 11,281,417 | B2 | 3/2022 | Nakayama et al. |
| 2015/0369874 | A1 | 12/2015 | Park et al. |
| 2020/0055421 | A1 | 2/2020 | Sastinsky |

(Continued)

FOREIGN PATENT DOCUMENTS

| EP | 1 786 057 A2 | 5/2007 |
| KR | 10-2021-0073497 A | 6/2021 |
| KR | 10-2289155 B1 | 8/2021 |

OTHER PUBLICATIONS

Extended European search report issued on Nov. 3, 2023, in counterpart European Patent Application No. 23179391.0 (11 pages).

(Continued)

*Primary Examiner* — Rodney A Butler
(74) *Attorney, Agent, or Firm* — NSIP Law

(57) ABSTRACT

A method for controlling a battery of an electric vehicle (EV) for trading includes collecting, by a battery management system (BMS), a usage history related to charging and discharging of the battery, determining a level of the battery based on the usage history, storing a grade of the battery as a reuse grade in a memory, in response to the level being determined to be a level 1, and changing the reuse grade stored in the memory to a recycle grade, in response to the level being determined to be a level 2.

7 Claims, 11 Drawing Sheets

(56) References Cited

U.S. PATENT DOCUMENTS

2021/0021000 A1    1/2021   Sada et al.
2021/0132153 A1    5/2021   Izumi et al.

OTHER PUBLICATIONS

Korean Office Action issued on Oct. 8, 2024, in counterpart Korean Patent Application No. 10-2022-0074600 (6 pages in English, 6 pages in Korean).
Extended European Search Report issued on Feb. 17, 2025, in counterpart European Patent Application No. 23179391.0 (9pages in English).

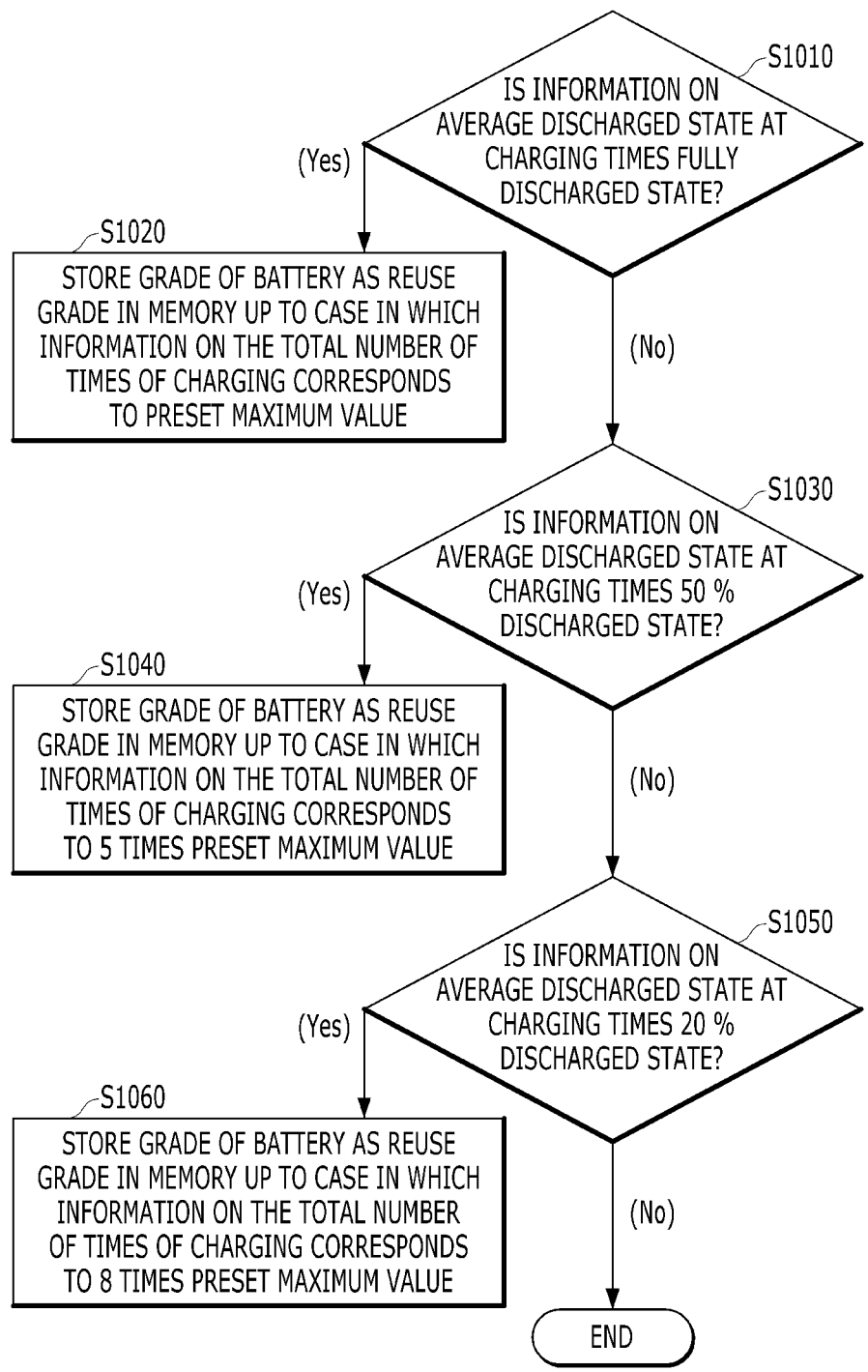

METHOD AND DEVICE FOR CONTROLLING A BATTERY USED IN ELECTRIC VEHICLE

CROSS-REFERENCE TO RELATED APPLICATIONS

This application claims the benefit under 35 U.S.C. § 119(a) to Korean Patent Application No. 10-2022-0074600, filed on Jun. 20, 2022, in the Korean Intellectual Property Office, the entire disclosure of which is incorporated herein by reference for all purposes.

BACKGROUND

1. Field

The present disclosure relates to an electric vehicle (EV), and more specifically, for example, corresponds to a technology for evaluating batteries and building a platform for recycling and easily trading batteries used in the EV.

2. Description of Related Art

An electric vehicle market is gradually expanding within the country and abroad. An electric vehicle has an advantage of being environmentally friendly, but a possibility that a waste battery problem will become serious in the future is emerging. A battery of the electric vehicle is not landfilled or incinerated like other waste. This is because lithium contained in the battery reacts quickly when it comes into contact with water or air, creating a risk of fire.

FIG. 1 is a graph showing an electric vehicle waste battery generation forecast announced by the Ministry of Environment. In Korea, waste batteries began to be discharged from 2018, which is relatively recent, and as of 2020, about 493 (cumulative) waste batteries were generated nationwide. The number of waste batteries is expected to increase exponentially. Based on estimates of the Ministry of Environment, there will be 13,826 waste batteries in 2024, followed by 42,092 in 2026, and the cumulative number of batteries will approach 100,000, making it almost certain to cause social problems.

FIG. 2 shows a process of reusing the waste battery of the electric vehicle according to the prior art.

As shown in FIG. 2, when the electric vehicle is scrapped, the battery is separated from a vehicle body, cleaned, and visually inspected, and then subjected to analysis on a state of charge, safety, and the like.

Thereafter, a battery pack is disassembled into modules, and evaluation on a capacity, a protection circuit, and the like is completed for the modules. After the evaluation, only a very small number of waste batteries are reused.

However, according to the prior art, because the complicated and time-consuming battery evaluation process shown in FIG. 2 is performed in the process of scrapping the electric vehicle, electric vehicle owners are less interested in the waste battery, and thus, a possibility of recycling the waste battery is not high. In addition, a hoist, a conveyor belt, and the like must be installed in a disassembly system for the battery pack, the module, and the like of the electric vehicle, and air purification in preparation for toxic gases that may occur during disassembly, firefighting equipment in preparation for fire, and the like must be secured.

Furthermore, in the past, the battery was obligatory to be returned to local governments when scrapping the electric vehicle. However, in fact, a problem of not having a place to store the electric vehicle batteries, which will increase in number exponentially, has been steadily raised by the local governments, and according to the currently amended Clean Air Conservation Act, owner's obligation to return the waste battery has been abolished starting from electric vehicles produced after 2021. However, there is no platform for individuals to easily recycle or trade the waste batteries.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of controlling a battery of an electric vehicle (EV), the method including collecting, by a battery management system (BMS), a usage history related to charging and discharging of the battery, determining a level of the battery based on the usage history, storing a grade of the battery as a reuse grade in a memory, in response to the level being determined to be a level 1, and changing the reuse grade stored in the memory to a recycle grade, in response to the level being determined to be a level 2.

The usage history related to the charging and the discharging of the battery may include information on the total number of times of charging of the battery and information on an average discharged state at the times of the charging.

The storing of the grade of the battery in the memory may include storing the grade of the battery as the reuse grade, in response to the information on the total number of times of charging corresponding to a maximum value when the information on the average discharged state at the charging times corresponds to a fully discharged state.

The storing of the grade of the battery in the memory may include storing the grade of the battery as the reuse grade, in response to the information on the total number of times of charging corresponds to 5 times the maximum value when the information on the average discharged state at the charging times corresponds to a 50% discharged state.

The storing of the grade of the battery in the memory may include storing the grade of the battery as the reuse grade in response to the information on the total number of times of charging corresponds to 8 times the maximum value when the information on the average discharged state at the charging times corresponds to a 20% discharged state.

The usage history related to the charging and the discharging of the battery may include a number of times of charging and discharging.

The determining of the level of the battery further may include provisionally determining the level of the battery based on the usage history, and confirming the level of the battery via electrical or chemical measurement of the battery, in response to the number of times of charging and discharging of the battery being equal to or smaller than a threshold.

The storing of the grade of the battery in the memory may include storing the grade of the battery as the reuse grade, in response to the information on the total number of times of charging being higher than a threshold when the information on the average discharged state at the charging times corresponds to a fully discharged state.

In another general aspect, there is provided a processor-implemented method for controlling a battery of an electric vehicle (EV), the method including receiving, at a server, a usage history related to charging and discharging of the battery from the EV, determining, at the server, a level of the battery based on the usage data, storing a grade of the battery as a reuse grade in a memory of the server, in response to the level being determined to be a level 1, and changing the reuse grade stored in the memory to a recycle grade, in response to the level being determined to be a level 2.

The usage history related to the charging and the discharging of the battery may include information on the total number of times of charging of the battery and information on an average discharged state at the times of the charging.

The storing of the grade of the battery in the memory may include storing the grade of the battery as the reuse grade, in response to the information on the total number of times of charging corresponding to a maximum value when the information on the average discharged state at the charging times corresponds to a fully discharged state.

The storing of the grade of the battery in the memory may include storing the grade of the battery as the reuse grade, in response to the information on the total number of times of charging corresponds to 5 times the maximum value when the information on the average discharged state at the charging times corresponds to a 50% discharged state.

The storing of the grade of the battery in the memory may include 'storing the grade of the battery as the reuse grade, in response to the information on the total number of times of charging corresponds to 8 times the maximum value when the information on the average discharged state at the charging times corresponds to a 20% discharged state.

The usage history related to the charging and the discharging of the battery may include a number of times of charging and discharging.

Other features and aspects will be apparent from the following detailed description, the drawings, and the claims.

BRIEF DESCRIPTION OF DRAWINGS

FIG. 10 shows a flowchart corresponding to a control method according to another embodiment of the present disclosure.

Figure 1:
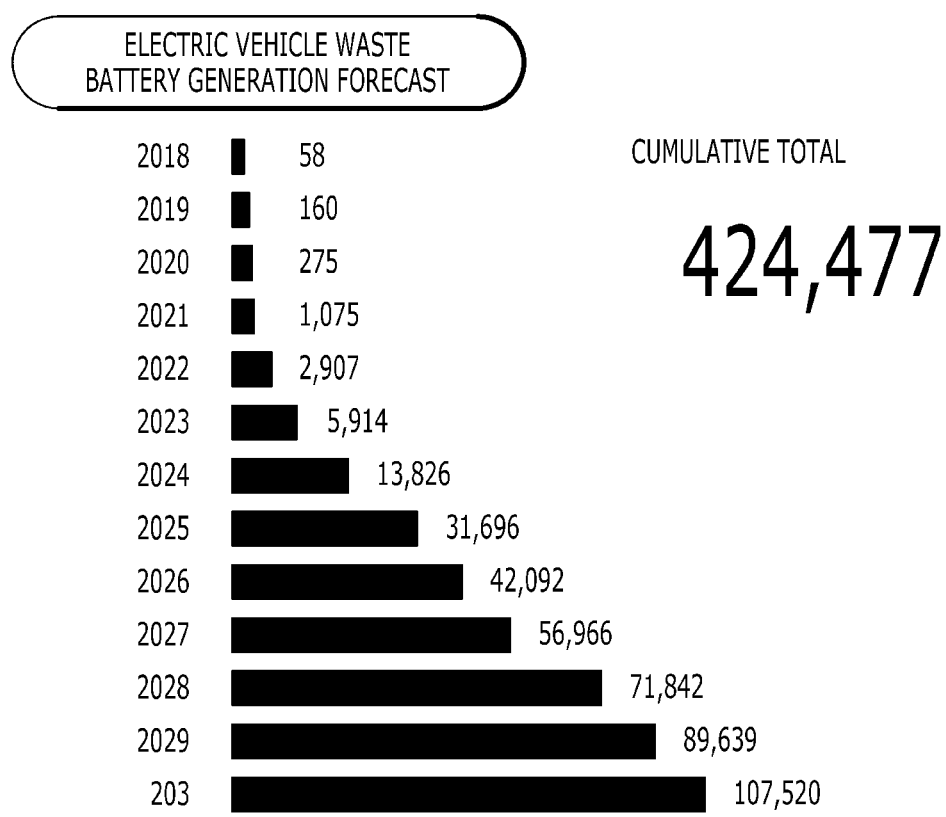
FIG. 1 is a graph showing an electric vehicle waste battery generation forecast announced by the Ministry of Environment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

Figure 3A:
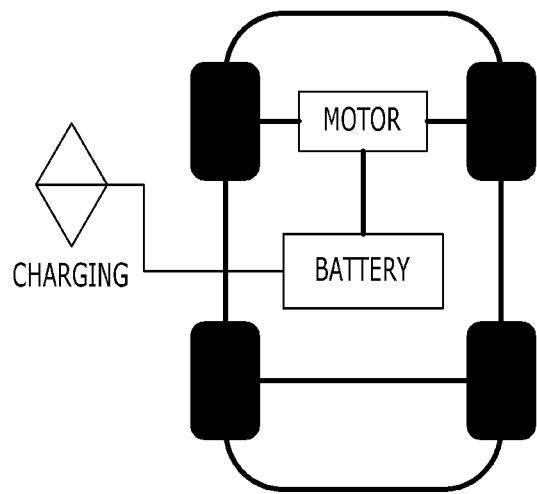
FIGS. 3A and 3B show types of electric vehicles to which an embodiment of the present disclosure is applicable.
Figure 3B:
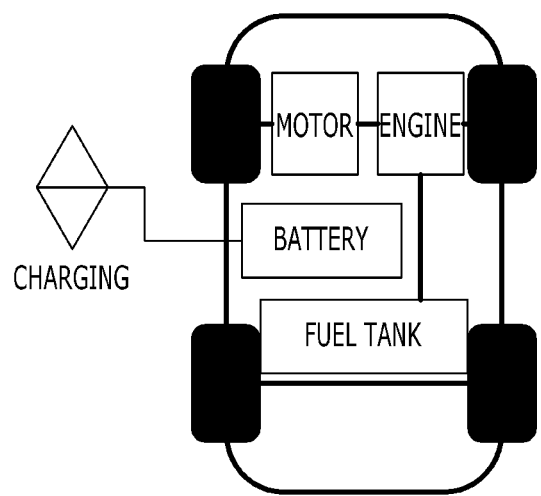

FIGS. 3A and 3B show types of electric vehicles to which an embodiment of the present disclosure is applicable. As described above, embodiments of the present disclosure relate to a technology for recycling a waste battery that was used in an electric vehicle. Hereinafter, in FIGS. 3A and 3B, the types of electric vehicles to which an embodiment of the present disclosure is applicable will be described in more detail.

An electric vehicle shown in FIG. 3A corresponds to a battery electric vehicle (BEV), and an electric vehicle shown in FIG. 3B corresponds to a plug-in hybrid electric vehicle (PHEV).

The battery electric vehicle refers to an electric vehicle that uses only electric energy obtained from a battery that may be charged with an external power source as a power source. A lithium battery capacity is about 40 kWh.

On the other hand, the plug-in hybrid electric vehicle refers to a hybrid electric vehicle in which the battery that may be charged with the external power source is a main power source and an engine plays an auxiliary role. A lithium battery capacity is about 12 kWh.

However, the present disclosure may be applied not only to the battery electric vehicle shown in FIG. 3A and the plug-in hybrid electric vehicle shown in FIG. 3B, but also to any type of vehicle equipped with a rechargeable secondary battery.

A configuration of the battery shown in FIGS. 3A-3B will be described in more detail with reference to FIG. 4 below.

Figure 4:
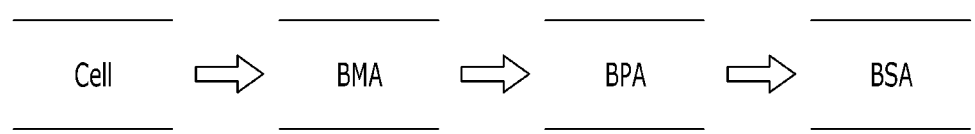
FIG. 4 shows structures of a battery to which an embodiment of the present disclosure is applicable.

FIG. 4 shows structures of a battery to which an embodiment of the present disclosure is applicable.

A battery cell shown in FIG. 4 is the most fundamental unit of a battery of the electric vehicle, and is composed of an anode, a cathode, a separator, and an electrolyte. Charging and discharging are performed by migration of lithium ions between the cathode and the anode, and a role of the separator for separating the two electrodes is important. The separator prevents problems such as overheating and ignition by properly blocking contact of the two electrodes and allowing only the ions to pass therethrough. Specific types of the battery cell include, for example, prismatic, cylindrical, and pouch types. However, the present disclosure is not limited thereto, and the scope of rights of the present disclosure should be determined based on the matters described in the claims.

When the aforementioned battery cells are connected to each other based on the standard, a battery module assembly (BMA) is completed. When the battery cells are prismatic, a capacity thereof may be great, and thus, about 90 battery cells are sufficient when connected to each other in series.

On the other hand, when the battery cells are of the pouch type, a capacity thereof is small because of a small thickness. Therefore, parallel connection is required, and about 280 battery cells are required.

Further, when the battery cells are cylindrical, thousands of battery cells are required for a battery system of one vehicle. As such battery cells are manufactured as the module, a technical effect of protecting the battery cells from an external impact or vibration is expected.

A battery pack assembly (BPA) refers to addition of an auxiliary function, such as a cooling device, to the battery module assembly (BMA) described above. The battery pack assembly is also composed of several battery module assemblies. By adding the cooling device or the like, there are technical effects of reducing deterioration resulted from the overheating of the battery and maintaining a constant temperature of the cells.

Lastly, a battery system assembly (BSA) includes the aforementioned BPA and the like, and will be described in more detail with reference to FIG. 5 below.

Figure 5:
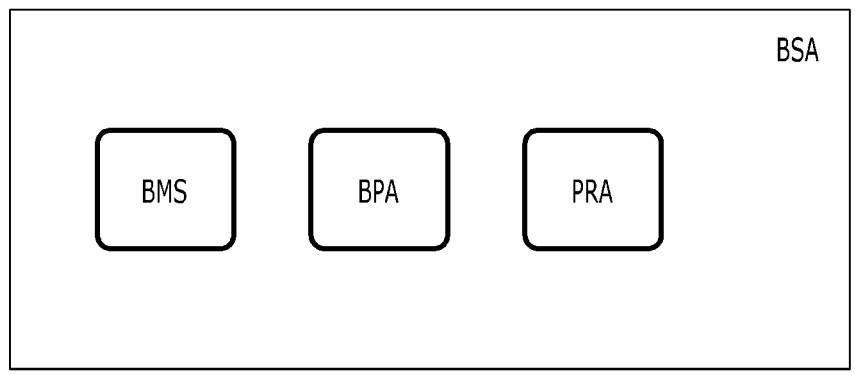
FIG. 5 is a diagram for illustrating a battery management system (BMS) and the like to which an embodiment of the present disclosure is applicable.

FIG. 5 is a diagram for illustrating a battery management system (BMS) and the like to which an embodiment of the present disclosure is applicable.

The BSA shown in FIG. 5 refers to a system that includes not only the aforementioned BPA, but also the BMS, a PRA, and the like.

The power relay assembly (PRA) plays a role in supplying/blocking power from a high-voltage battery to/from a motor. In addition, to prevent damage to an inverter caused by high-voltage inrush current before driving a relay, the PRA may perform initial charging via a precharge relay, and may also include a fast charging relay for quick charging with DC voltage.

In this regard, the battery management system (BMS) refers to a control system or the like that receives battery information sensed by a sensor to determine a situation and maintains an appropriate battery state.

More specifically, the BMS may measure a state of charge of the battery. For example, the BMS is designed to measure a charging capacity of each battery cell using various sensors and measurement schemes.

Furthermore, the BMS performs balancing of the cell charging capacities. For example, the BMS plays a role in making the charging capacities of the cells at a similar level by discharging a cell that is at a higher charge level than other cells via data of the measured SOC (state of charge) of each cell. This may reduce a capacity deviation.

In addition to the function described above, the BMS executes functions such as battery temperature management and performance diagnosis alarms using vehicle communication (controller area network, CAN).

A brief circuit diagram of the entire electric vehicle including such a BMS will be described below with reference to FIG. 6.

Figure 6:
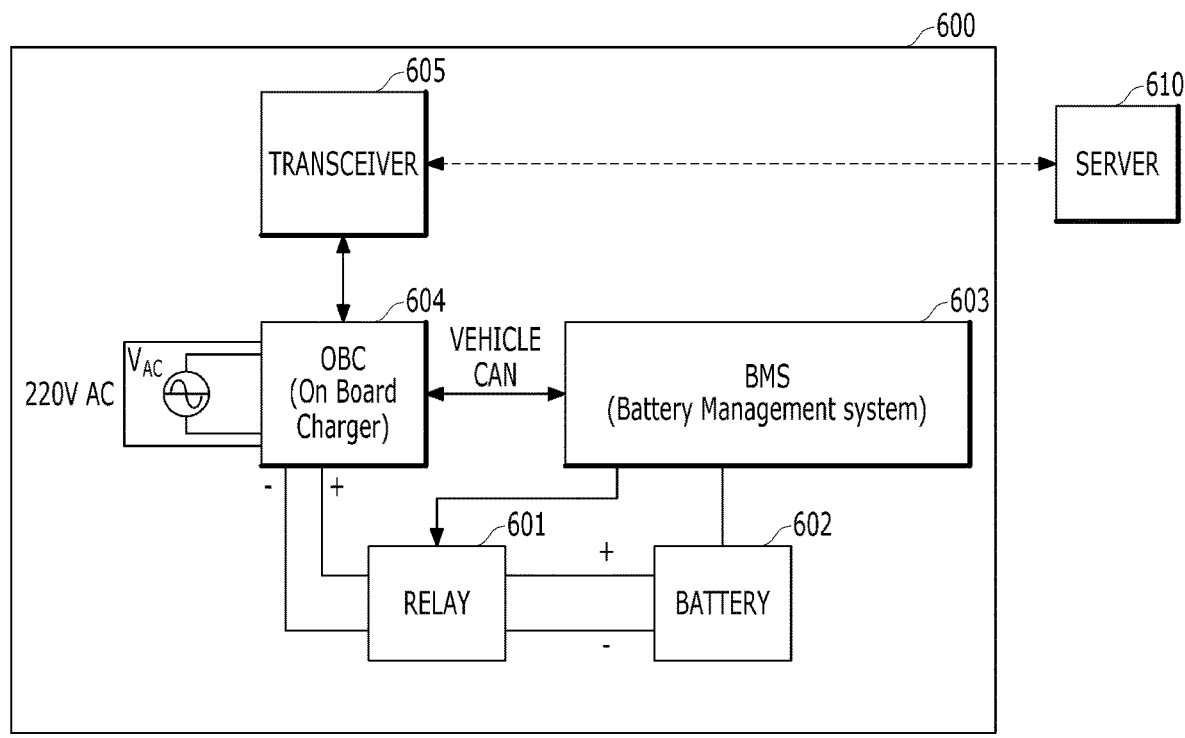
FIG. 6 shows an EV including a BMS and a battery according to an embodiment of the present disclosure.

FIG. 6 shows an EV including a BMS and a battery according to an embodiment of the present disclosure.

As shown in FIG. 6, an electric vehicle 600 according to one embodiment of the present disclosure includes a transceiver 605, an on board charger (OBC) 604, a battery management system (BMS) 603, a relay 601, a battery 602, and the like. However, the circuit diagram shown in FIG. 6 is merely an example for convenience of description, and the scope of rights of the present disclosure should be determined based on the matters described in the claims.

For example, when 220 V AC voltage is applied, the OBC 604 is turned on and transmits a wake-up signal to the BMS 603, and transmits state information thereof to the BMS 603 and the transceiver 605 when the BMS 603 operates in response to the transmitted wake-up signal.

The BMS 603 operates when the wake-up signal is transmitted from the OBC 604 and receives the state information from the OBC 604. When it is determined that the OBC 604 is in a normal state based on the received state information of the OBC 604, the BMS 603 allows the relay 601 of the OBC 604 to be turned on, and transmits voltage and current control commands to the OBC 604 for the OBC 604 to charge the battery 602 accordingly.

The OBC 604 receives the voltage and current control commands from the BMS 603, and determines whether the received voltage and current control commands conform to a preset charging condition. When the received voltage and current control commands conform to the preset charging condition as a result of the determination, the OBC 604 converts the applied 220V AC power to DC and transmits the DC power to the battery 602, and transmits charging information based on charging progress to the transceiver 605.

The BMS 603 senses a state of the battery 602 being charged, repeats the operation of transmitting the voltage and current control commands to the OBC 604 based on the sensed information, and allows the OBC 604 to continue charging the battery 602.

In addition, when the charging of the battery 602 is completed based on the sensing result, the BMS 603 performs charging completion control for the OBC 604 to complete the charging of the battery 602, and allows the relay 601 to be turned off.

The OBC 604 terminates the operation of converting the applied 220V AC power into the DC and transmitting the DC power to the battery 602 in response to the charging completion control of the BMS 603, and transmits charging termination information to the transceiver 605.

The transceiver 605 stores the state information and the charging information of the battery 602 received from the OBC 604, and transmits the stored state information of the OBC 604 to a server 610 upon receiving a request for the state information from the server 610.

Furthermore, the EV 600 according to one embodiment of the present disclosure is designed for the BMS 603 to have an additional function, unlike the prior art, to allow the battery 602 to be quickly traded individually via an online platform in the future.

The BMS 603 according to one embodiment of the present disclosure additionally collects log data corresponding to a usage history related to charging and discharging of the battery 602. Furthermore, the BMS 603 is designed to determine a level of the battery 602 based on the collected log data.

Further, when it is determined that the level of the battery 602 corresponds to a level 1, the BMS 603 stores a grade of the battery 602 as a reuse grade in a memory (not shown). Here, the reuse grade refers to, for example, a grade that the battery 602 may be used for another electric vehicle (in case of having a charging ability equal to or greater than % of an initial storage capacity of the battery 602) or for another purpose (in case of having a charging ability in a range from 70 to 80% of the initial storage capacity of the battery 602).

Said another purpose refers to a case in which the waste battery of the electric vehicle is used by changing a use thereof to an energy storage system (ESS), an uninterruptible power system (UPS), or the like.

The ESS is an energy storage device that stores power therein and supplies the power when needed, and the UPS is an uninterruptible power supply that supplies emergency power in case of a power outage. Because the ESS and the UPS do not require high output like the electric vehicle, the waste battery may be recycled for another purpose.

Furthermore, when it is determined that the level of the battery 602 corresponds to a level 2, the BMS 603 changes the grade of the battery 602 to a recycle grade from the reuse grade.

Here, the recycle grade refers to, for example, a use of remanufacturing a new battery by extracting raw materials from the waste battery when the battery 602 is deteriorated in a performance and thus is difficult to be reused (in case of having a charging ability equal to or smaller than 70% or 60% of the initial storage capacity of the battery 602). In the waste battery, lithium is chemically strongly bonded to nickel, cobalt, manganese, and the like. When lithium is removed first, it is easy to extract the remaining raw materials, which may reduce costs. For reference, when the waste battery is recycled, a carbon dioxide emission may be reduced by 40 to 70% compared to when mining metals in mines or salt lakes.

Further, to more quickly determine the level of the battery in real time, the BMS 603 detects information on the number of cycles including the number of times of charging and discharging of the battery 602 and determines the level of the battery based on the detected information.

For example, when the number of charging/discharging cycles is, for example, equal to or smaller than 1000 as a result of log data analysis of the BMS 603, it is determined that the level of the battery 602 corresponds to the level 1 and the grade of the battery 602 is stored as the reuse grade in the memory (not shown).

On the other hand, when the number of charging/discharging cycles is, for example, greater than 1000 as the result of log data analysis of the BMS 603, it is determined that the level of the battery 602 corresponds to the level 2 and the grade of the battery 602 is stored as the recycle grade in the memory (not shown).

Figure 2:
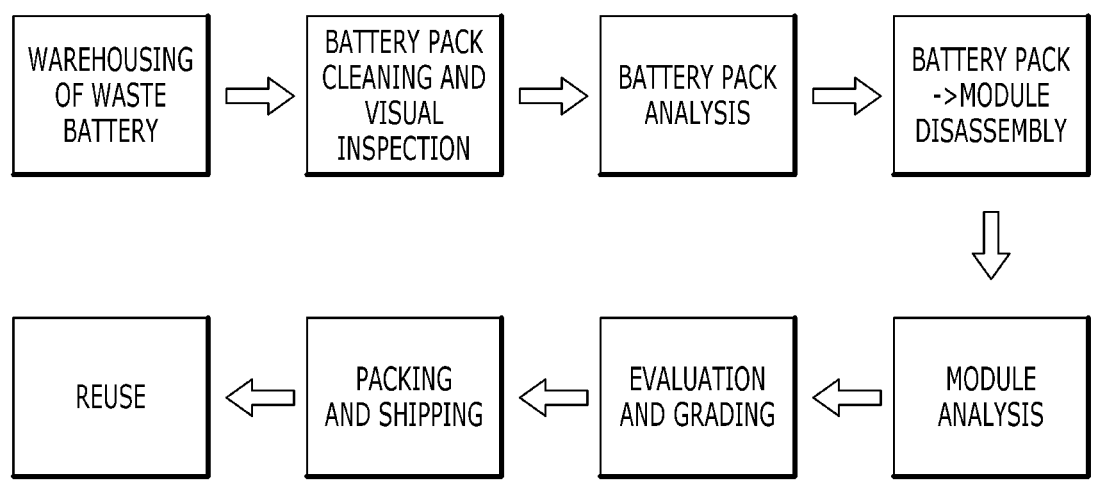
FIG. 2 shows a process of reusing a waste battery of an electric vehicle according to the prior art.

In the case of such design, unlike the prior art shown in FIG. 2, the process of determining the grade of the waste battery may be performed more quickly, and thus, the trade of the waste battery may also be activated more quickly.

In the previous embodiment, it has been described that only information on the number of times of charging and discharging is used as the usage history related to the charging and the discharging of the battery.

However, according to another embodiment of the present disclosure, as the usage history related to the charging and the discharging of the battery, information on the total number of times of charging and information on an average discharged state at charging times are more specifically managed, and thus, it is expected that accuracy may be more improved.

When an average discharged state at all charging times is a fully discharged state as a result of the analysis of the BMS 603, the grade of the battery 602 is stored as the reuse grade in the memory up to a case in which the information on the total number of times of charging corresponds to a preset maximum value (e.g., 1000 times).

On the other hand, when the information on the average discharged state at all of the charging times corresponds to a 50% discharged state as the result of the analysis of the BMS 603, the grade of the battery 602 is stored as the reuse grade in the memory up to a case in which the information on the total number of times of charging corresponds to 5 times the maximum value (e.g., 1000 times).

Further, when the information on then average discharged state at all of the charging times corresponds to a 20% discharged state as the result of the analysis of the BMS 603, the grade of the battery 602 is stored as the reuse grade in the memory up to a case in which the information on the total number of times of charging corresponds to 8 times the maximum value (e.g., 1000 times). This is a design considering that a life of the battery varies based on a discharged state at the charging time.

Additionally, although it has been described above that the BMS 603 manages all of the log data for the battery and the like, designing the log data collected by the BMS to be transmitted to the server 610 via the transceiver 605 and the grade of the battery 602 to be determined by the server 610 also falls within another scope of rights of the present disclosure. In particular, in the case of such design, when an owner of the electric vehicle 600 wants to sell the battery 602 of the vehicle, there is an advantage in that the server 610, which serves as a platform related to battery purchase, may respond more quickly.

The embodiment shown in FIG. 6, as described above, has the advantage of increasing the speed of the waste battery grade determination in that only the log data of the BMS is used and electrical/chemical tests on the battery are not performed. However, an embodiment that may consider not only the speed but also accuracy of the waste battery grade determination will be described in FIG. 7 below.

Figure 7:
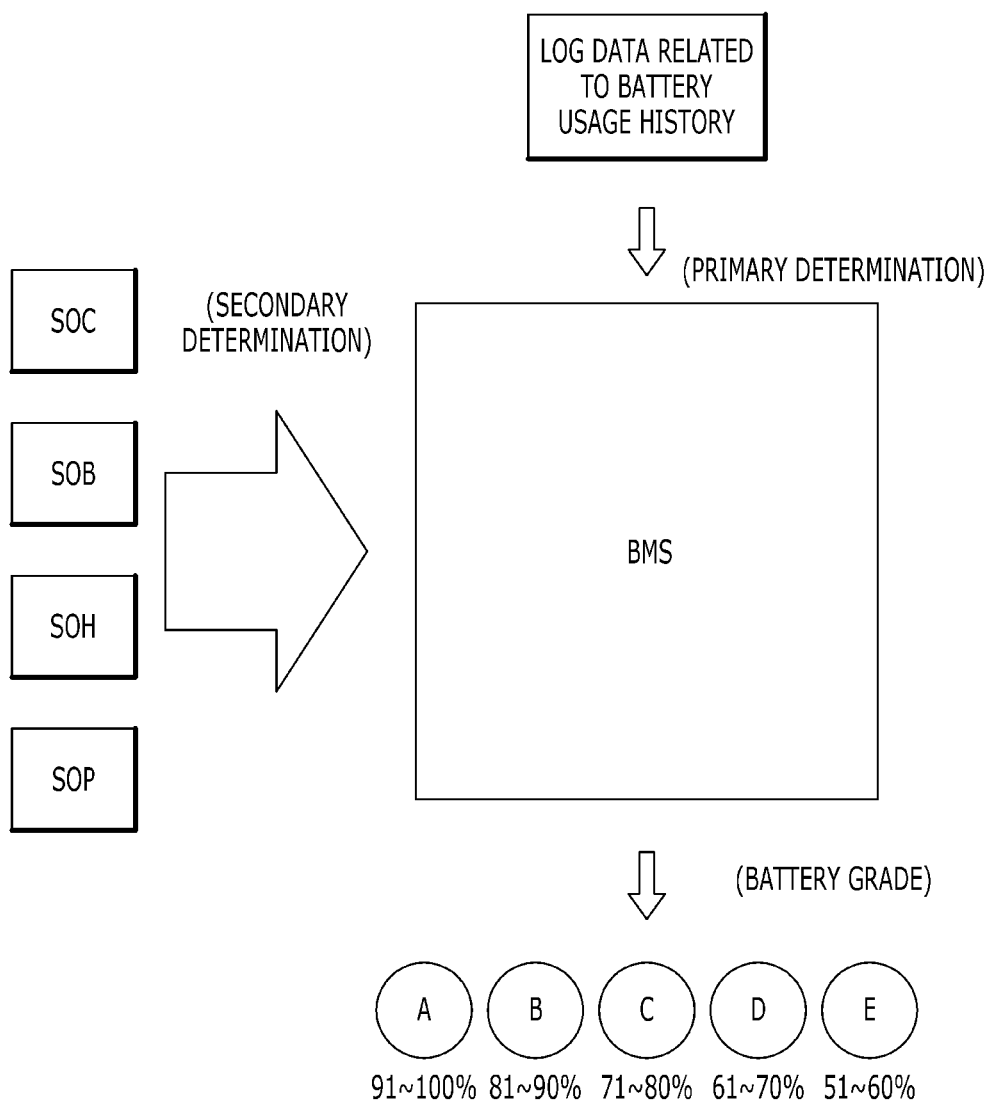
FIG. 7 is a diagram for illustrating a relationship between two processes for determining a grade of a waste battery according to an embodiment of the present disclosure.

FIG. 7 is a diagram for illustrating a relationship between two processes for determining a grade of a waste battery according to an embodiment of the present disclosure.

As described above with reference to FIG. 6, according to one embodiment of the present disclosure, the BMS 603 primarily determines the level of the battery based on the log data (e.g., the number of charging/discharging cycles and the like) related to the battery usage history.

However, designing to trigger a procedure of finally confirming the level of the battery via additional electrical/chemical measurements (the state of charge (SOC), a state of balance (SOB), a state of health (SOH), and a state of power (SOP)) for the battery only in cases in which it is ambiguous whether the level of the battery is suitable for the reuse or the recycling only with the log data related to the battery usage history also falls within another scope of rights of the present disclosure.

A method for performing the electrical/chemical measurements of the battery will be described in more detail as an example. The state of charge (SOC) of the battery is analyzed as a value of current integration via the charging and the discharging of the battery.

In addition, the SOB is evaluated to evaluate a voltage balance between the battery cells. The SOB may be designed to be analyzed as a deviation value between all cells in each module or pack.

In addition, in the case of the state of health (SOH) of the battery, the state after three repetitions using, for example, 1/3C of a standard current amount (C-rate) of the battery state is evaluated.

Furthermore, in the case of state of power (SOP) of the battery, it is designed to derive a value via an alternating current internal resistance (ACIR) technique utilizing a direct current internal resistance (DCIR), which is an internal resistance, and an electrical impedance spectroscopy (EIS).

For example, it is designed to check more accurately whether the grade of the battery corresponds to the reuse grade in secondary determination only when the number of times of charging and discharging of the battery is equal to or smaller than a certain value (e.g., 1000 times) as a result of the primary determination (using only the log data related to the battery usage history) shown in FIG. 7.

When the number of times of charging and discharging of the battery is equal to or smaller than the certain value (e.g., 1000 times), a possibility of the grade of the battery being determined as the reuse grade is high, but a possibility of an error occurring based on a charging pattern of a user (or a driver) of the electric vehicle cannot be excluded.

In particular, because there is a greater need to prevent an accident resulted from the error in the case of the reuse grade than the recycle grade, it is designed that, in a hybrid type, the primary battery grade determination is preceded and then the grade of the battery is finally confirmed in the secondary determination only when the certain condition described above as an example is satisfied. Therefore, it is expected that there will be technical significance in improving both the speed and the accuracy of battery quality evaluation.

In FIG. 7, the grades of the waste battery are grouped into a grade A, a grade B, a grade C, a grade D, and a grade E. As an example, 91 to 100% of the grade A means that the waste battery currently has a storage capacity in a range from 91 to 100% of the initial storage capacity of the battery.

81 to 90% of the grade B means that the waste battery currently has a storage capacity in a range from 81 to 90% of the initial storage capacity of the battery.

71 to 80% of the grade C means that the waste battery currently has a storage capacity in a range from 71 to 80% of the initial storage capacity of the battery.

61 to 70% of the grade D means that the waste battery currently has a storage capacity in a range from 61 to 70% of the initial storage capacity of the battery.

In addition, 51 to 60% of the grade E means that the waste battery currently has a storage capacity in a range from 51 to 60% of the initial storage capacity of the battery.

In addition, as an example, the grade A, the grade B, and the grade C shown in FIG. 7 refer to grades that the waste battery may be reused, and the grade D and the grade E shown in FIG. 7 refer to grades that the waste battery may be recycled.

Furthermore, further subdividing the grades according to one embodiment of the present disclosure, the grade A and the grade B are grades that the waste battery may be reused for the electric vehicle or the like, while the grade C is distinguished as a grade that the waste battery may be reused for a small device such as an electric bicycle or the like.

Figure 8:
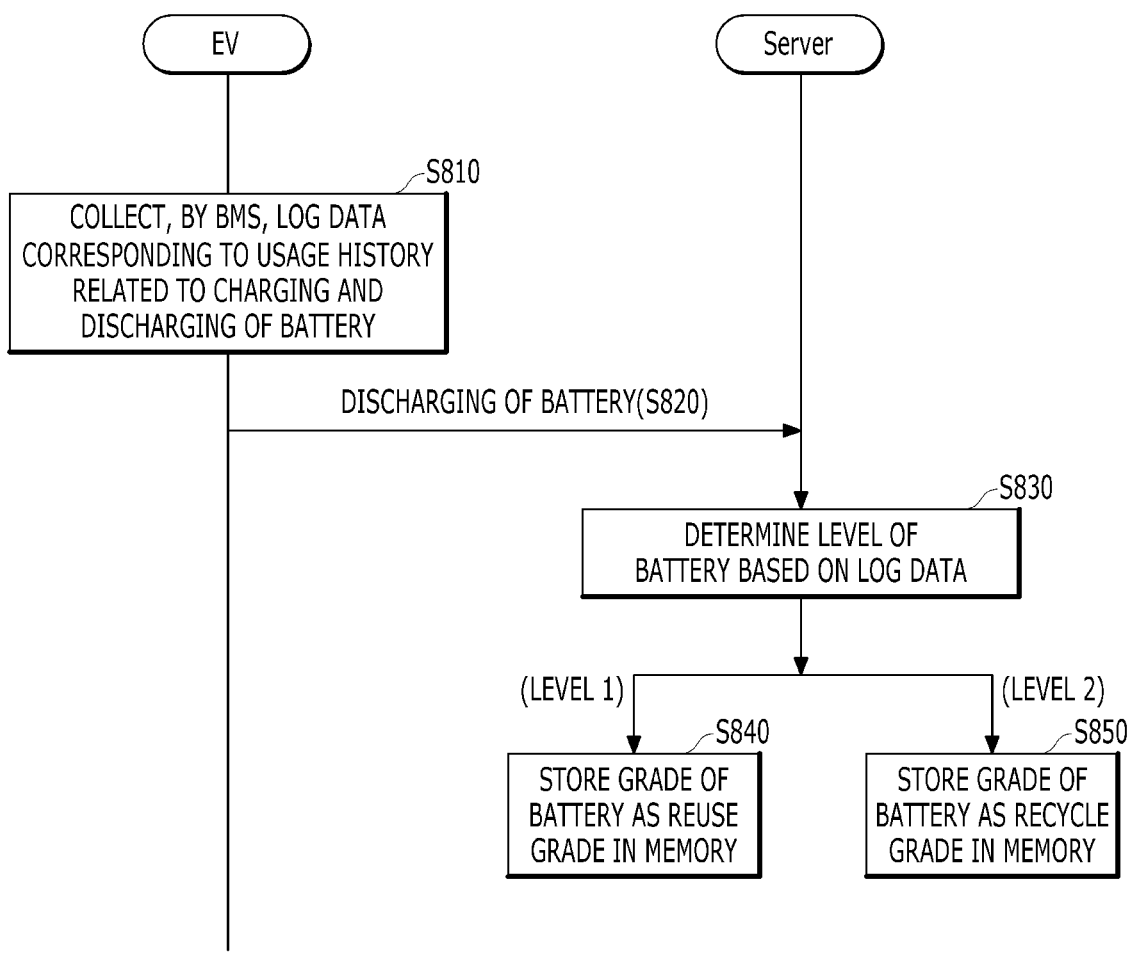
FIG. 8 shows a flowchart corresponding to a control method according to an embodiment of the present disclosure.

FIG. 8 shows a flowchart corresponding to a control method according to an embodiment of the present disclosure. A person skilled in the art may supplement or extend an interpretation of FIG. 8 with reference to the above drawings.

According to one embodiment of the present disclosure, the battery management system (BMS) inside the electric vehicle collects the log data corresponding to the usage history related to the charging and the discharging of the battery (S810).

Further, the log data collected by the BMS of the electric vehicle may be designed to be transmitted to the server via a communication transceiver (e.g., the reference numeral 605 shown in FIG. 6) (S820).

The server determines the level of the battery based on the log data received from the electric vehicle (S830).

When the level of the battery corresponds to the level 1 as the result of determination (S830), the grade of the battery is stored as the reuse grade in the memory (S840). For example, when the number of charging/discharging cycles is equal to or smaller than 1000 as the result of log data analysis of the BMS, it is determined that the level of the battery corresponds to the level 1.

On the other hand, when the level of the battery corresponds to the level 2 as the result of determination (S830), it is designed to change the reuse grade stored in the memory to the recycle grade (S850). For example, when the number of charging/discharging cycles is greater than 1000 as the result of log data analysis of the BMS, it is determined that the level of the battery corresponds to the level 2.

Although it is shown in FIG. 8 that the grade of the battery is determined by the server, designing the BMS, a CPU, various controllers, and the like of the electric vehicle to directly determine the grade of the battery also falls within another scope of rights of the present disclosure.

Figure 9:
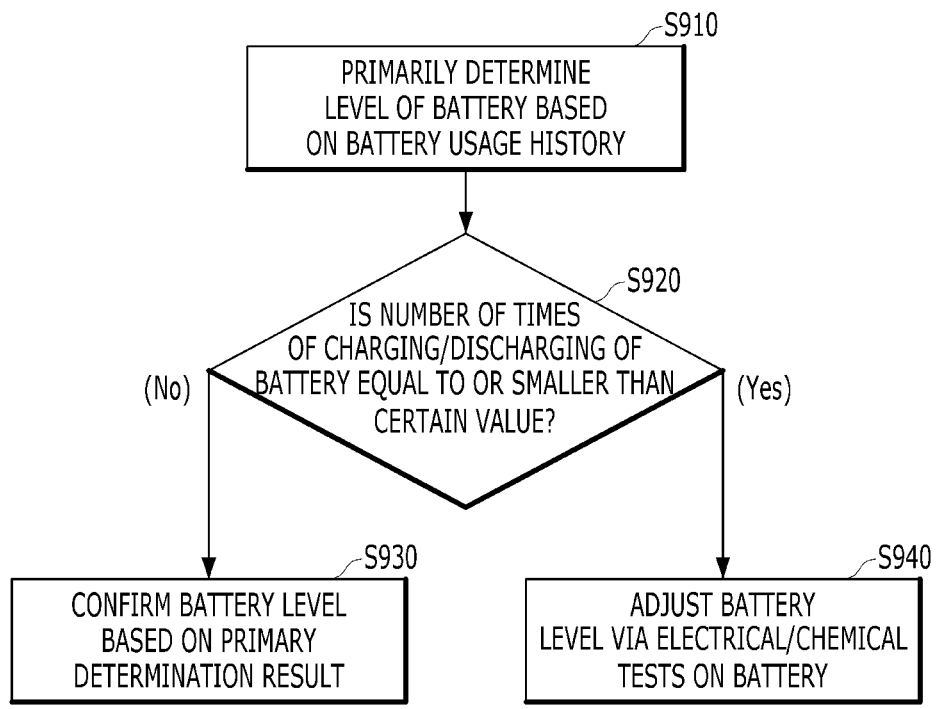
FIG. 9 is a flowchart corresponding to a control method according to another embodiment of the present disclosure.

FIG. 9 is a flowchart corresponding to a control method according to another embodiment of the present disclosure.

It has been described as an example in FIG. 8 that the BMS uses only the log data related to the charging/discharging of the battery, but an embodiment of finally adjusting the grade of the battery via the additional electrical/chemical tests on the battery only when the specific condition is satisfied will be described in FIG. 9.

First, the electric vehicle according to one embodiment of the present disclosure primarily determines the level of the battery based on the battery usage history (e.g., the information on the number of times of charging and discharging of the battery of the electric vehicle and the like) (S910). At this operation, the level of the battery is not confirmed, but is only determined provisionally. For example, when the number of times of charging/discharging of the battery is greater than 1000 times, the level of the battery is provisionally determined as the recycle grade, whereas when the number of times of charging/discharging of the battery is equal to or smaller than 1000 times, the level of the battery is temporarily determined as the reuse grade.

Further, the electric vehicle according to one embodiment of the present disclosure determines whether the number of times of charging/discharging of the battery is equal to or smaller than the certain value (e.g., 1000 times) (S920).

When the number of times of charging and discharging of the battery is not equal to or smaller than the certain value as a result of the determination (S920), it is designed that the grade of the battery is confirmed to be the grade (e.g., the recycle) of the battery determined in S910 (S930).

On the other hand, when the number of times of charging and discharging of the battery is equal to or smaller than the certain value as the result of the determination (S920), the grade of the battery is not immediately confirmed to be the grade (e.g., the recycle) of the battery determined in S910, but is finally confirmed via the electrical/chemical tests on the battery (S940).

Further, FIG. 10 shows a flowchart corresponding to a control method according to another embodiment of the present disclosure. In another embodiment of the present disclosure, a specific algorithm for further improving the accuracy of the battery grade evaluation using the information on the total number of times of charging and the information on the average discharged state at the charging times are used as the log data corresponding to the usage history related to the charging/discharging of the battery will be described with reference to FIG. 10 below.

Some or all of operations shown in FIG. 10 will be described as being performed in the electric vehicle, but designing the server that has received the log data of the BMS from the electric vehicle to perform the same or similar operation also falls within the scope of rights of the present disclosure.

First, the electric vehicle according to one embodiment of the present disclosure is designed to determine whether the information on the average discharged state at the charging times of the battery corresponds to the fully discharged state (S1010).

When the information on the average discharged state at the charging times of the battery corresponds to the fully discharged state as a result of the determination (S1010), the electric vehicle according to one embodiment of the present disclosure stores the grade of the battery as the reuse grade in the memory up to the case in which the information on the total number of times of charging corresponds to the preset maximum value (e.g., 1000 times) (S1020).

On the other hand, when the information on the average discharged state at the charging times of the battery does not correspond to the fully discharged state as the result of the determination (S1010), the electric vehicle according to one embodiment of the present disclosure determines whether the information on the average discharged state at the charging times corresponds to the 50% discharged state (S1030).

When the information on the average discharged state at the charging times of the battery corresponds to the 50% discharged state as the result of the determination (S1030), the electric vehicle according to one embodiment of the present disclosure stores the grade of the battery as the reuse grade in the memory up to the case in which the information on the total number of times of charging corresponds to 5 times the maximum value (e.g., 1000 times) (S1040).

On the other hand, when the information on the average discharged state at the charging times of the battery does not correspond to the 50% discharged state as the result of the determination (S1030), the electric vehicle according to one embodiment of the present disclosure determines whether the information on the average discharged state at the charging times corresponds to the 20% discharged state (S1050).

When the information on the average discharged state at the charging times of the battery corresponds to the 20% discharged state as the result of the determination (S1050), the electric vehicle according to one embodiment of the present disclosure stores the grade of the battery as the reuse grade in the memory up to the case in which the information on the total number of times of charging corresponds to 8 times the maximum value (e.g., 1000 times) (S1060).

As described above, as even the information on the average discharged state at the charging times of the battery is utilized as the log data, the grade of the battery may be more accurately estimated, and the speed of the grade evaluation may be improved.

Furthermore, the trade may be activated via the server after the quick grade evaluation for the waste battery.

As disclosed above, provided is a system for more quickly and accurately determining a grade of a battery that was used in an electric vehicle.

As disclosed above, provided is an accumulate processes or the like by which a platform (individual, company, or the like) for trading a waste battery of an electric vehicle may be automated and more activated.

The computing apparatuses, the electronic devices, the processors, the units, the memories, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVDRs, DVD+Rs, DVDRWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for determining a condition of a battery of an electric vehicle (EV), the method comprising:
    collecting, by a battery management system (BMS), a usage history related to charging and discharging of the battery;
    determining a level of the battery based on the usage history corresponding to a number of charging/discharging cycles of the battery, the level being determined to be level 1 if the number of charging/discharging cycles is below a predetermined number or level 2 if the number of charging/discharging cycles is above the predetermined number;

storing a grade of the battery as a reuse grade in a memory, in response to the level being determined to be level 1; and changing the reuse grade stored in the memory to a recycle grade, in response to the level being determined to be level 2, wherein the usage history related to the charging and the discharging of the battery comprises information on the total number of times of charging of the battery and information on an average discharged state at the times of the charging, and wherein the storing of the grade of the battery in the memory comprises storing the grade of the battery as the reuse grade, in response to the information on the total number of times of charging corresponding to a maximum value when the information on the average discharged state at the charging times corresponds to a fully discharged state.

2. The method of claim 1, wherein the storing of the grade of the battery in the memory comprises storing the grade of the battery as the reuse grade, in response to the information on the total number of times of charging corresponding to 5 times the maximum value when the information on the average discharged state at the charging times corresponds to a 50% discharged state.

3. The method of claim 2, wherein the storing of the grade of the battery in the memory comprises storing the grade of the battery as the reuse grade in response to the information on the total number of times of charging corresponds to 8 times the maximum value when the information on the average discharged state at the charging times corresponds to a 20% discharged state.

4. The method of claim 1, wherein the determining of the level of the battery further comprises:

provisionally determining the level of the battery based on the usage history; and confirming the level of the battery via electrical or chemical measurement of the battery, in response to the number of times of charging and discharging of the battery being equal to or smaller than a threshold.

5. A processor-implemented method for controlling a server to determine a condition of a battery of an electric vehicle (EV), the method comprising:

receiving, by the server, log data corresponding to a usage history related to charging and discharging of the battery from the EV;

determining, by the server, a level of the battery based on the received log data corresponding to a number of charging/discharging cycles of the battery, the level being determined to be level 1 if the number of charging/discharging cycles is below a predetermined number or level 2 if the number of charging/discharging cycles is above the predetermined number;

storing a grade of the battery as a reuse grade in a memory of the server, in response to the level being determined to be a level 1; and changing the reuse grade stored in the memory to a recycle grade, in response to the level being determined to be a level 2, wherein the usage history related to the charging and the discharging of the battery comprises information on the total number of times of charging of the battery and information on an average discharged state at the times of the charging, and wherein the storing of the grade of the battery in the memory comprises storing the grade of the battery as the reuse grade, in response to the information on the total number of times of charging corresponding to a maximum value when the information on the average discharged state at the charging times corresponds to a fully discharged state.

6. The method of claim 5, wherein the storing of the grade of the battery in the memory comprises storing the grade of the battery as the reuse grade, in response to the information on the total number of times of charging corresponding to 5 times the maximum value when the information on the average discharged state at the charging times corresponds to a 50% discharged state.

7. The method of claim 6, wherein the storing of the grade of the battery in the memory comprises storing the grade of the battery as the reuse grade, in response to the information on the total number of times of charging corresponds to 8 times the maximum value when the information on the average discharged state at the charging times corresponds to a 20% discharged state.

* * * * *